(12) United States Patent
Chen et al.

(10) Patent No.: US 10,746,595 B2
(45) Date of Patent: Aug. 18, 2020

(54) AMBIENT-LIGHT-SENSING HOLE STRUCTURE PACKAGE AND METHOD OF MANUFACTURING THE SAME

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chun-Hung Chen, Guangdong (CN); Jing-Bing Yu, Guangdong (CN); Tai-Wu Lin, Guangdong (CN); Yen-Chang Yao, Guangdong (CN); Ya-Ting Chang, Guangdong (CN); Pang-Chiang Chia, Guangdong (CN); Yen-Heng Huang, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

(*) Notice: Subject to any disclaimer, the term of this patent is extended or adjusted under 35 U.S.C. 154(b) by 107 days.

(21) Appl. No.: 15/972,253

(22) Filed: May 7, 2018

(65) Prior Publication Data
US 2019/0285467 A1 Sep. 19, 2019

(30) Foreign Application Priority Data
Mar. 14, 2018 (CN) .......................... 2018 1 0209351

(51) Int. Cl.
*G01J 1/42* (2006.01)
*B23P 19/04* (2006.01)
(Continued)

(52) U.S. Cl.
CPC ............ *G01J 1/4204* (2013.01); *B23P 19/04* (2013.01); *B29C 65/48* (2013.01); *G01J 1/0455* (2013.01)

(58) Field of Classification Search
CPC ...... G01J 1/4204; G01J 1/0455; G01J 1/0437; B29C 65/48; B23P 19/04
(Continued)

(56) References Cited

U.S. PATENT DOCUMENTS 7,755,022 B2 * 7/2010 Colvin, Jr. ........... A61B 5/0031
250/214 AL
8,803,071 B2 * 8/2014 Wieser ................ H01L 31/0203
250/214 AL
(Continued)

FOREIGN PATENT DOCUMENTS

CN 107679523 A * 2/2018

*Primary Examiner* — Seung C Sohn
(74) *Attorney, Agent, or Firm* — CKC & Partners Co., LLC

(57) ABSTRACT

An ambient-light-sensing hole structure package and a method of manufacturing the same are provided. The ambient-light-sensing hole structure package includes a transparent cover, a decorative layer, a porous structure layer, and an optical adhesive. The transparent cover has a surface. The decorative layer is disposed on the surface and the decorative layer has an opening that exposes a portion of the surface. The porous structure layer is disposed on one side of the decorative layer and the porous structure layer covers the portion of the surface. The porous structure layer includes a plurality of through holes, and the through holes overlap with the opening. The optical adhesive is interposed between the decorative layer and the porous structure layer.

10 Claims, 4 Drawing Sheets

(51) Int. Cl.
*B29C 65/48* (2006.01)
*G01J 1/04* (2006.01)

(58) Field of Classification Search
USPC .......................................... 250/214 AL, 239
See application file for complete search history.

(56) References Cited

U.S. PATENT DOCUMENTS 9,392,706 B2 * 7/2016 Yoo ...................... H05K 5/0017
9,855,720 B2 * 1/2018 Jones ...................... B32B 3/266

* cited by examiner

AMBIENT-LIGHT-SENSING HOLE STRUCTURE PACKAGE AND METHOD OF MANUFACTURING THE SAME

CROSS-REFERENCE TO RELATED APPLICATION

This application claims priority to Chinese Application Serial Number 201810209351.1, filed Mar. 14, 2018, which is herein incorporated by reference in its entirety.

BACKGROUND

Field of Invention

The present invention relates to an ambient-light-sensing hole structure package and a method of manufacturing the same.

Description of Related Art

With the rapid advances in technologies, mobile devices such as smart phones and tablets have become an indispensable part of human's life. Current mobile devices integrate multiple functions together, such as communication, networking, photography, games, and data processing. The versatile design makes mobile devices more popular with consumers. Since the mobile device is equipped with diversified functions, it is necessary to use various detecting devices to detect the surrounding environment for the purpose of achieving various corresponding applications. Examples of common detecting devices include ambient light sensors, proximity sensors, and the like. Among them, the ambient light sensors utilize photosensitive components to detect the ambient light, and the detected light intensities are converted to corresponding electric signals, that are further processed subsequently.

In order to accurately detect the ambient light, the optical requirements for the corresponding ambient light sensing hole are extremely high. At present, the methods for manufacturing the ambient light sensing hole mainly employs laser technologies or photolithography-etching processes in order to meet the optical requirement. However, the manufacturing methods mentioned above cost much, and the venders are limited.

SUMMARY

According to one aspect of the present disclosure, a method of manufacturing an ambient-light-sensing hole structure package is provided. The manufacturing method may significantly reduce production costs.

The above method for manufacturing the ambient-light-sensing hole structure package includes the steps described below. A transparent cover is provided. A decorative layer is formed on the transparent cover and the decorative layer has an opening. A transparent film is provided. A multi-pore structural layer is formed on the transparent film to form a functional layer, wherein the multi-pore structural layer includes a plurality of through holes. The functional layer is adhered to the decorative layer using an optical adhesive, wherein the through holes overlap the opening.

In one embodiments of the present disclosure, the multi-pore structural layer is interposed between the transparent film and the optical adhesive.

In one embodiments of the present disclosure, the transparent film is interposed between the multi-pore structural layer and the optical adhesive.

According to another aspect of the present disclosure, an ambient-light-sensing hole structure package is provided. The ambient-light-sensing hole structure package includes a transparent cover, a decorative layer, a multi-pore structural layer, and an optical adhesive. The transparent cover has a surface. The decorative layer is disposed on the surface, and the decorative layer has an opening exposing a portion of the surface. The multi-pore structural layer is disposed adjacent to a side of the decorative layer, and the multi-pore structural layer covers the portion of the surface, wherein the multi-pore structural layer includes a plurality of through holes, and the through holes overlap the opening. The optical adhesive is interposed between the decorative layer and multi-pore structural layer.

In one embodiments of the present disclosure, the ambient-light-sensing hole structure package further includes a transparent film. The multi-pore structural layer is disposed on the transparent film. The multi-pore structural layer is interposed between the transparent film and the optical adhesive.

In one embodiments of the present disclosure, the ambient-light-sensing hole structure package further includes a transparent film. The multi-pore structural layer is disposed on the transparent film. The transparent film is interposed between the multi-pore structural layer and the optical adhesive.

In one embodiments of the present disclosure, the through holes are arranged in a concentric circular array or a rectangular array.

In one embodiments of the present disclosure, a diameter of each through hole ranges from 30 micrometers to 65 micrometers.

In one embodiments of the present disclosure, a first distance is present between any two adjacent ones of the through holes, and the first distance ranges from 50 micrometers to 65 micrometers.

In one embodiments of the present disclosure, the multi-pore structural layer laterally extends a second distance, the opening has a pore diameter, and the second distance is at least 1 mm greater than the pore diameter.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
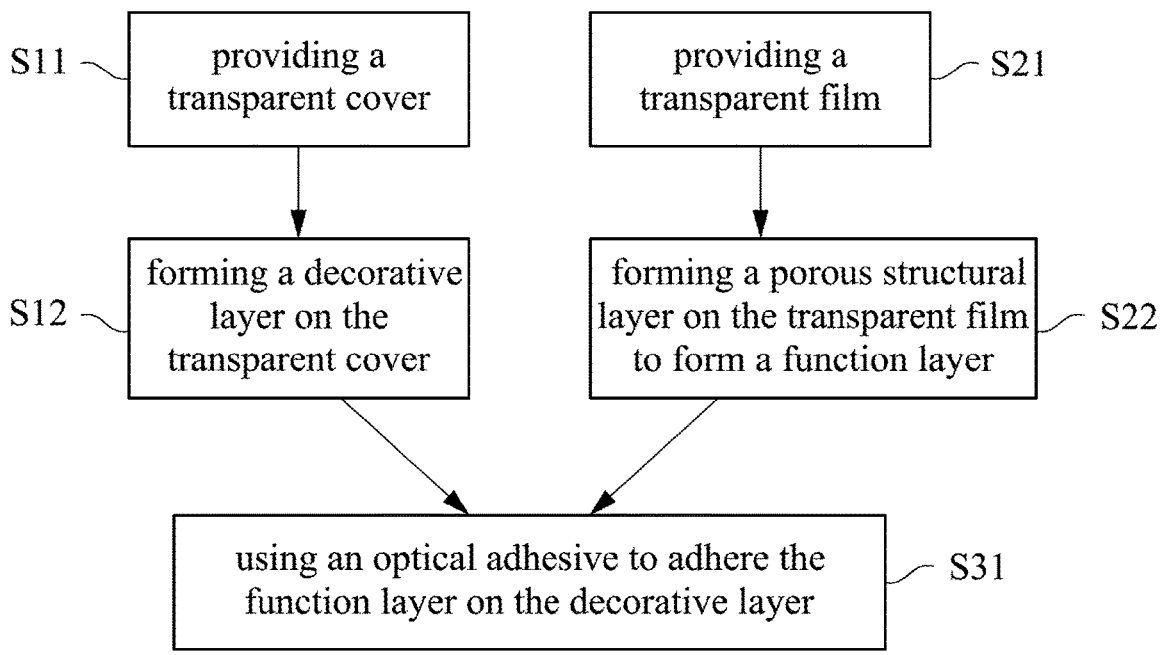
FIG. 1 illustrates a flow chart of a method of manufacturing the ambient-light-sensing hole structure package, in accordance with one embodiment.

Reference will now be made in detail to the present embodiments of the invention, examples of which are illustrated in the accompanying drawings. Wherever possible, the same reference numbers are used in the drawings and the description to refer to the same or like parts.

According to one aspect of the present disclosure, a method of manufacturing an ambient-light-sensing hole structure package is provided, and the ambient-light-sensing hole structure package obtained by the manufacturing method can significantly reduce the manufacturing costs. FIG. 1 illustrates a flow chart of a method 10 of manufacturing the ambient-light-sensing hole structure package (such as ambient-light-sensing hole structure package 600 shown in FIGS. 6A and 6B), in accordance with one embodiment. FIG. 2 to FIG. 6B are cross-sectional views illustrating various process stages of manufacturing the ambient-light-sensing hole structure package, in accordance with some embodiments. As shown in FIG. 1, the method 10 includes step S11, step S12, step S21, step S22, and step S31.

Figure 2:
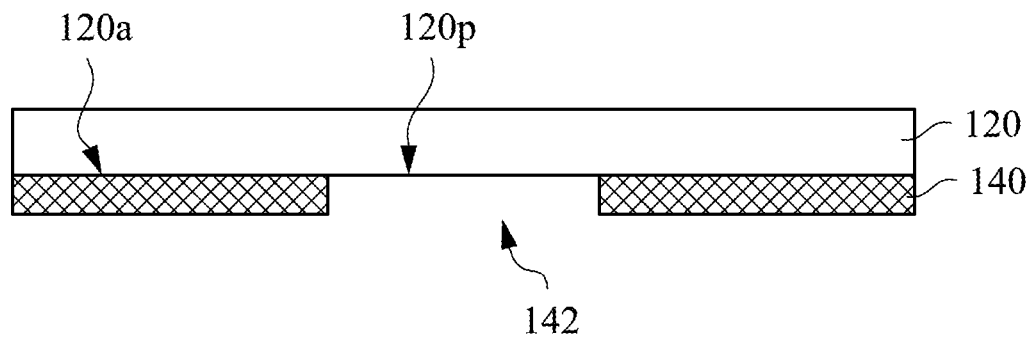
FIG. 2 to FIG. 6B are cross-sectional views illustrating various process stages of manufacturing the ambient-light-sensing hole structure package, in accordance with some embodiments.

In step S11, a transparent cover 120 is provided, as shown in FIG. 2. To be specific, the transparent cover 120 has a surface 120a. In one embodiment, the materials of the transparent cover 120 may be glass or plastic materials, but not limited thereto. For example, the glass materials may be sapphire, crystal, or other materials with properties similar to glass; the plastic materials may be organic polymeric materials such as polyethylene terephthalate (PET), polycarbonate (PC), polymethyl methacrylate (PMMA), epoxy, polyimide (PI), and/or bismaleimide triazine (BT).

In step S12, a decorative layer 140 is formed on the transparent cover 120, as shown in FIG. 2. To be specific, the decorative layer 140 is formed on the surface 120a of the transparent cover 120. More specifically, the decorative layer 140 has an opening 142 to expose a portion 120p of the surface 120a. In one embodiment, the material of the decorative layer 140 may be a light-shielding material or a decoration material with function of blocking light, such as an ink or a photoresist, but the present invention is not limited thereto. In some embodiments of the present invention, the decorative layer 140 may be formed on the transparent cover 120 by printing processes, coating processes, or other suitable processes.

Figure 3:
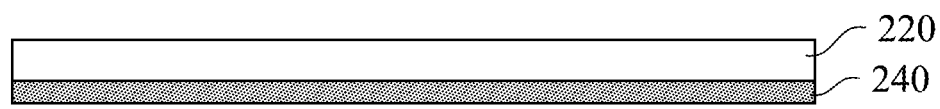

In step S21, a transparent film 220 is provided, as shown in FIG. 3. In some embodiments, the material of the transparent film 220 may include polycarbonate (PC), polyethylene terephthalate (PET), polymethylmethacrylate (PMMA), or cyclic olefin copolymer (COC).

Figure 4:
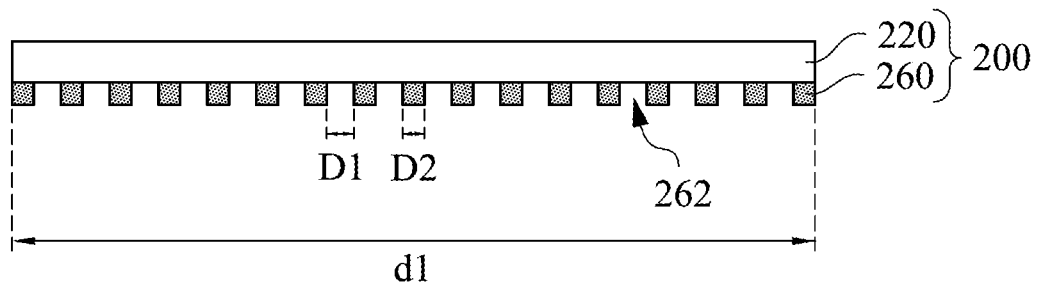

In step S22, a multi-pore structural layer 260 is formed on the transparent film 220, as shown in FIG. 3 and FIG. 4, which are schematic cross-sectional views for implementing step S22, in accordance with one embodiment of the present invention. First, a structural layer 240 is formed on the transparent film 220. In some embodiments, the material of the structural layer 240 may be the same as or different from the material of the decorative layer 140. It can be understand that when the material of the structural layer 240 is the same as the material of the decorative layer 140, the appearance of the structural layer 240 is visually more beautiful. In some embodiments of the present invention, structural layer 240 may be formed on the transparent film 220 by printing processes, coating processes, or other suitable processes.

Then, as shown in FIG. 4, a lithography process is performed on the structural layer 240 to form a plurality of through holes 262 penetrating the structural layer 240, thereby forming the multi-pore structural layer 260. In this way, a functional layer 200 is constituted, wherein the functional layer 200 includes the multi-pore structural layer 260 disposed on the transparent film 220, and the multi-pore structural layer 260 includes a plurality of through holes 262. In some embodiments, these through holes 262 may be arranged in a concentric circular array or a rectangular array in the top view. In some embodiments, a diameter D1 of each through hole 262 may range from 30 um to 65 um. For example, the diameter D1 of the through holes 262 may be 35 um, 40 um, 45 um, 50 um, 55 um, or 60 um. In some embodiments, there is a first distance D2 between any two adjacent through holes 262, and the first distance D2 may range from 50 um to 200 um. For example, the first distance D2 may be 60 um, 70 um, 80 um, 90 um, 100 um, 110 um, 120 um, 130 um, 140 um, 150 um, 160 um, 170 um, 180 um, or 190 um.

Figure 5A:
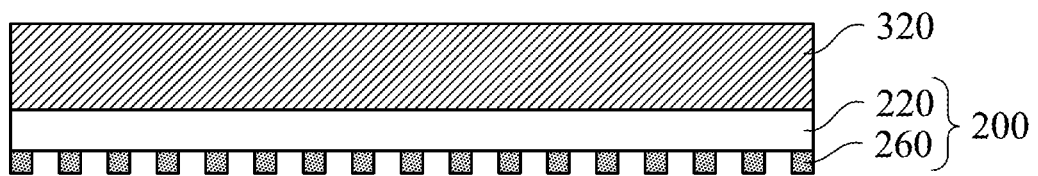
Figure 5B:
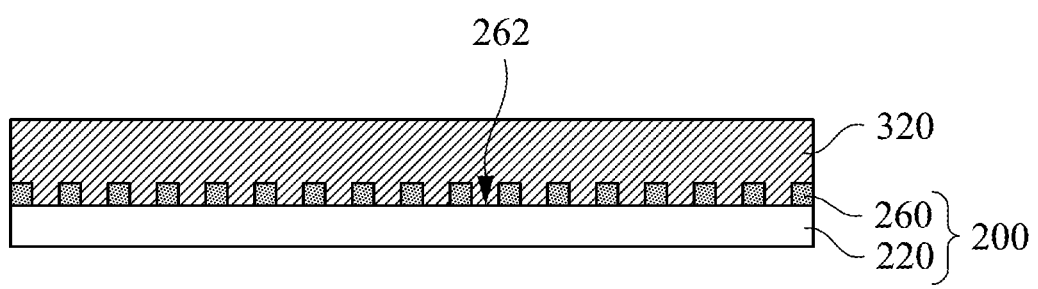
Figure 6A:
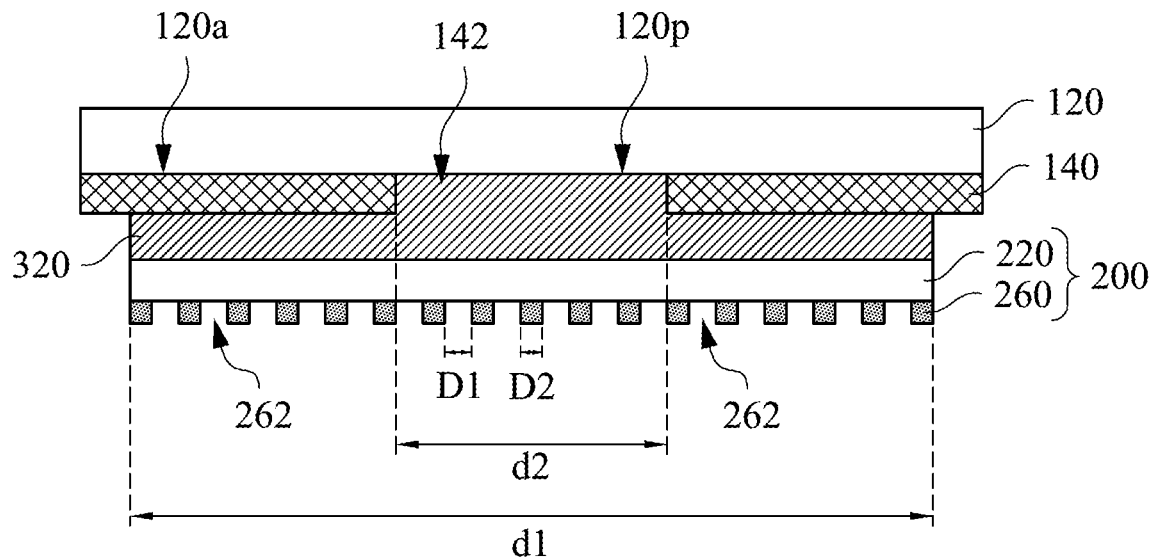
Figure 6B:
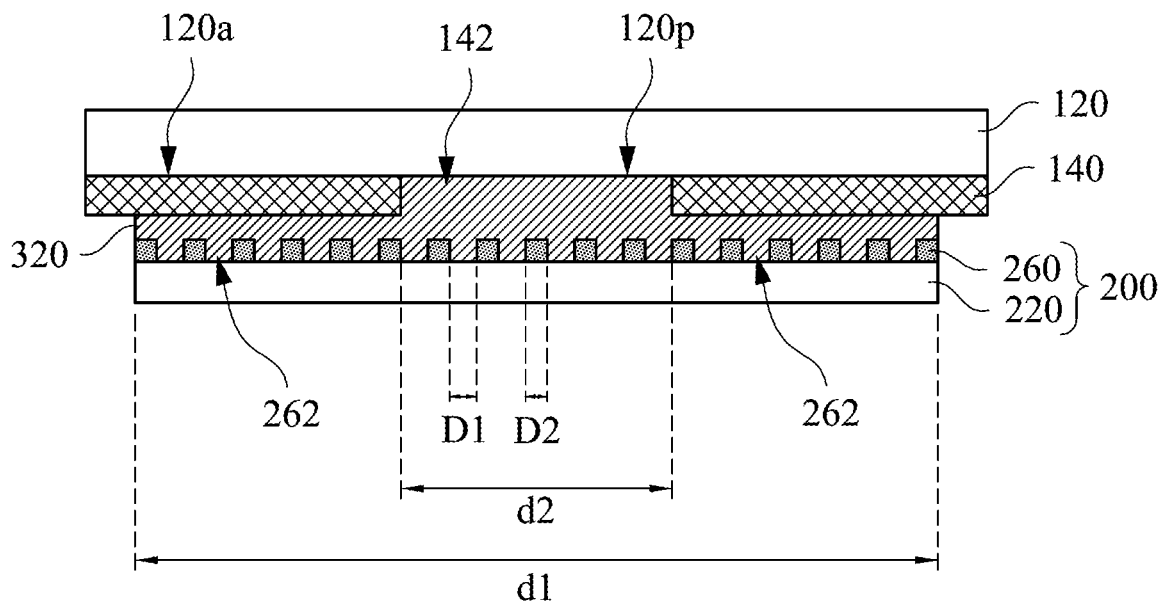

In step S31, an optical adhesive 320 is used to adhere the functional layer 200 to the decorative layer 140. FIG. 5A and FIG. 6A are schematic cross-sectional views for implementing step S31 according to one embodiment of the present invention. FIG. 5B and FIG. 6B are schematic cross-sectional views for implementing step S31 according to another embodiment of the present invention. As shown in FIG. 5A, the optical adhesive 320 is formed on the transparent film 220 and opposite to the multi-pore structural layer 260. In one embodiment, the optical adhesive 320 may be an optically clear adhesive (OCA) or a liquid optically clear adhesive (LOCA). Next, as shown in FIG. 6A, the structure illustrated in FIG. 5A is attached to the decorative layer 140 shown in FIG. 2 to form the ambient-light-sensing hole structure package 600. Therefore, in one embodiment, the transparent film 220 is interposed between the multi-pore structural layer 260 and the optical adhesive 320. It is noted that the through holes 262 of the multi-pore structural layer 260 overlap the opening 142 of the decorative layer 140. In some embodiments, the opening 142 of the decorative layer 140 has a pore diameter d2, and the multi-pore structural layer 260 laterally extends a second distance d1, in which the second distance d1 is at least 1 mm greater than the pore diameter d2 so as to be more convenient for subsequent process operations.

In another embodiment of the present invention, as shown in FIG. 5B, the optical adhesive 320 is formed on the transparent film 220 and completely covered the multi-pore structural layer 260. Next, as shown in FIG. 6B, the structure illustrated in FIG. 5B is attached to the decorative layer 140 shown in FIG. 2 to form the ambient-light-sensing hole structure package 600. Therefore, in one embodiment, the multi-pore structural layer 260 is interposed between the transparent film 220 and the optical adhesive 320. It is noted that the through holes 262 of the multi-pore structural layer 260 overlap the opening 142 of the decorative layer 140. In some embodiments, the opening 142 of the decorative layer 140 has a pore diameter d2, and the multi-pore structural layer 260 laterally extends a second distance d1, in which the second distance d1 is at least 1 mm greater than the pore diameter d2 so as to be more convenient for subsequent process operations.

According to another aspect of the present disclosure, an ambient-light-sensing hole structure package 600 is provided. FIG. 6A is cross-sectional view illustrating the ambient-light-sensing hole structure package 600 in accordance with one embodiment. The ambient-light-sensing hole structure package 600 includes a transparent cover 120, a decorative layer 140, a multi-pore structural layer 260, and an optical adhesive 320. The transparent cover 120 has a surface 120a. The decorative layer 140 is disposed on the surface 120a, and the decorative layer 140 has an opening 142 exposing a portion 120p of the surface 120a. The multi-pore structural layer 260 is disposed at a side adjacent to the decorative layer 140, and the multi-pore structural layer 260 overlaps the portion 120p of the surface 120a. The multi-pore structural layer 260 includes a plurality of through holes 262 and these through holes 262 overlap the opening 142.

In some embodiments, the through holes 262 of the multi-pore structural layer 260 may be arranged in a concentric circular array or a rectangular array in the top view. In some embodiments, a diameter D1 of each through hole 262 may range from 30 um to 65 um. For example, the diameter D1 of the through holes 262 may be 35 um, 40 um, 45 um, 50 um, 55 um, or 60 um. In some embodiments, there is a first distance D2 between any two adjacent through holes 262, and the first distance D2 may range from 50 um to 200 um. For example, the first distance D2 may be 60 um, 70 um, 80 um, 90 um, 100 um, 110 um, 120 um, 130 um, 140 um, 150 um, 160 um, 170 um, 180 um, or 190 um. In some embodiments, the opening 142 of the decorative layer 140 has a pore diameter d2, and the multi-pore structural layer 260 laterally extends a second distance d1, wherein the second distance d1 is at least 1 mm greater than the pore diameter d2 so as to be more convenient for subsequent process operations.

Referring to FIG. 6A, an optical adhesive 320 is interposed between the decorative layer 140 and the multi-pore structural layer 260. In one embodiment, the ambient-light-sensing hole structure package 600 may further include a transparent film 220 and the multi-pore structural layer 260 is disposed on the transparent film 220, wherein the transparent film 220 is interposed between the multi-pore structural layer 260 and the optical adhesive 320.

FIG. 6B is cross-sectional view illustrating the ambient-light-sensing hole structure package 600 according to another embodiment. The ambient-light-sensing hole structure package 600 includes a transparent cover 120, a decorative layer 140, a multi-pore structural layer 260, and an optical adhesive 320. The transparent cover 120 has a surface 120a. The decorative layer 140 is disposed on the surface 120a and the decorative layer 140 has an opening 142 exposing a portion 120p of the surface 120a. The multi-pore structural layer 260 is disposed at a side adjacent to the decorative layer 140, and the multi-pore structural layer 260 overlap the portion 120p of the surface 120a. The multi-pore structural layer 260 includes a plurality of through holes 262 and these through holes 262 overlap the opening 142.

In some embodiments, the through holes 262 of the multi-pore structural layer 260 may be arranged in a concentric circular array or a rectangular array in the top view. In some embodiments, a diameter D1 of each through hole 262 may range from 30 um to 65 um. For example, the diameter D1 of the through holes 262 may be 35 um, 40 um, 45 um, 50 um, 55 um, or 60 um. In some embodiments, there is a first distance D2 between any two adjacent through holes 262, and the first distance D2 may range from 50 um to 200 um. For example, the first distance D2 may be 60 um, 70 um, 80 um, 90 um, 100 um, 110 um, 120 um, 130 um, 140 um, 150 um, 160 um, 170 um, 180 um, or 190 um. In some embodiments, the opening 142 of the decorative layer 140 has a pore diameter d2, and the multi-pore structural layer 260 extends laterally a second distance d1, wherein the second distance d1 is at least 1 mm greater than the pore diameter d2 so as to be more convenient for subsequent process operations.

Referring to FIG. 6B, an optical adhesive 320 is interposed between the decorative layer 140 and the multi-pore structural layer 260. In one embodiment, the ambient-light-sensing hole structure package 600 may further include a transparent film 220, and the multi-pore structural layer 260 is disposed on the transparent film 220, wherein the multi-pore structural layer 260 is interposed between the transparent film 220 and the optical adhesive 320.

It could be understood that the ambient light sensor (not shown) may be directly disposed under the functional layer 200 of the ambient-light-sensing hole structure package 600 and aligned with the opening 142 of the decorative layer 140 so as to receive the ambient light.

In addition, the ambient-light-sensing hole structure package of the present invention may be further combined with other components, such as a driving module, a transparent electrode, a color filter, a black matrix, and/or a backlight, to form a display panel device.

When the ambient light reaches the photo sensor through the ambient light sensing hole, the light may be converted into electrical energy by the analog-to-digital conversion processor of the photo sensor. Furthermore, other controllers may be equipped so that the entire system may automatically adjust the brightness of the display panel. To be specific, if a user is in a dark environment, the brightness of the backlight of the display panel may be reduced to save power and provide a more comfortable brightness for the user. Conversely, if the user is in a brighter environment, the backlight brightness of the display panel may be increased. Table 1 below shows the experimental results of the transmittance decay of the light through the ambient-light-sensing hole structure package at different light incident angles, in which a green light wave band (i.e., the center of the wavelength band is at 550 nm) is chosen to perform the experiments sine green light is most sensitive to the human eye.

TABLE 1

Transmittances through the ambient-light-sensing hole structure packages at different light incident angles

| ALS | Transmittance at a light incident angle of 0° (%) | Transmittance at a light incident angle of 55° (%) | Light transmittance decay rate (%) |
|---|---|---|---|
| Conventional ambient-light-sensing hole structure package | 7.49% | 6.88% | 8% |
| Ambient-light-sensing hole structure package of the present invention | 6.56% | 6.09% | 7% |

Table 1 shows that the ambient-light-sensing hole structure package of the present invention and the conventional ambient-light-sensing hole structure package have a similar light transmittance at the light incident angles of 0° and 55°. According to the optical requirements for the ambient light sensing hole, the decay rate of the light transmittance between the light incident angle of 55° and 0° must be less than 20%, so that the corresponding light sensor has better light sensing qualities. Therefore, the ambient-light-sensing hole structure package obtained by the manufacturing method of the present invention not only reduce production costs, but also achieve the same optical effect as the conventional ambient-light-sensing hole structure package.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An ambient-light-sensing hole structure package, comprising:
   a transparent cover having a surface;
   a decorative layer disposed on the surface, and the decorative layer having an opening exposing a portion of the surface, wherein a material of the decorative layer includes a light-shielding material, and the opening has a pore diameter;
   a multi-pore structural layer disposed adjacent to a side of the decorative layer, and the multi-pore structural layer covering the portion of the surface, wherein the multi-pore structural layer comprises a plurality of through holes, and the through holes overlap the opening, wherein the pore diameter of the opening is greater than a diameter of each through hole; and
   an optical adhesive interposed between the decorative layer and multi-pore structural layer.

2. The ambient-light-sensing hole structure package of claim 1, further comprising a transparent film, the multi-pore structural layer being disposed on the transparent film, wherein the multi-pore structural layer is interposed between the transparent film and the optical adhesive.

3. The ambient-light-sensing hole structure package of claim 1, further comprising a transparent film, and the multi-pore structural layer disposed on the transparent film, wherein the transparent film is interposed between the multi-pore structural layer and the optical adhesive.

4. The ambient-light-sensing hole structure package of claim 1, wherein the through holes are arranged in a concentric circular array or a rectangular array.

5. The ambient-light-sensing hole structure package of claim 4, wherein the diameter of each through hole ranges from 30 micrometers to 65 micrometers.

6. The ambient-light-sensing hole structure package of claim 4, wherein a first distance is present between any two adjacent ones of the through holes, and the first distance ranges from 50 micrometers to 65 micrometers.

7. The ambient-light-sensing hole structure package of claim 1, wherein the multi-pore structural layer laterally extends a second distance, and the second distance is at least 1 mm greater than the pore diameter.

8. A method of manufacturing the ambient-light-sensing hole structure package, the method comprising the following steps:
   providing a transparent cover;
   forming a decorative layer on the transparent cover, the decorative layer having an opening, wherein a material of the decorative later includes a light-shielding material and the opening has pore diameter;
   providing a transparent film;
   forming a multi-pore structural layer on the transparent film to form a functional layer, wherein the multi-pore structural layer comprises a plurality of through holes, wherein the pore diameter of the opening is greater than a diameter of each through hole; and
   adhering the functional layer to the decorative layer using an optical adhesive, wherein the through holes overlap the opening.

9. The manufacturing method of claim 8, wherein the multi-pore structural layer is interposed between the transparent film and the optical adhesive.

10. The manufacturing method of claim 8, wherein the transparent film is interposed between the multi-pore structural layer and the optical adhesive.

* * * * *